Aug. 27, 1935.  A. P. WOOD  2,012,844
BEARING BRACKET
Filed April 1, 1932
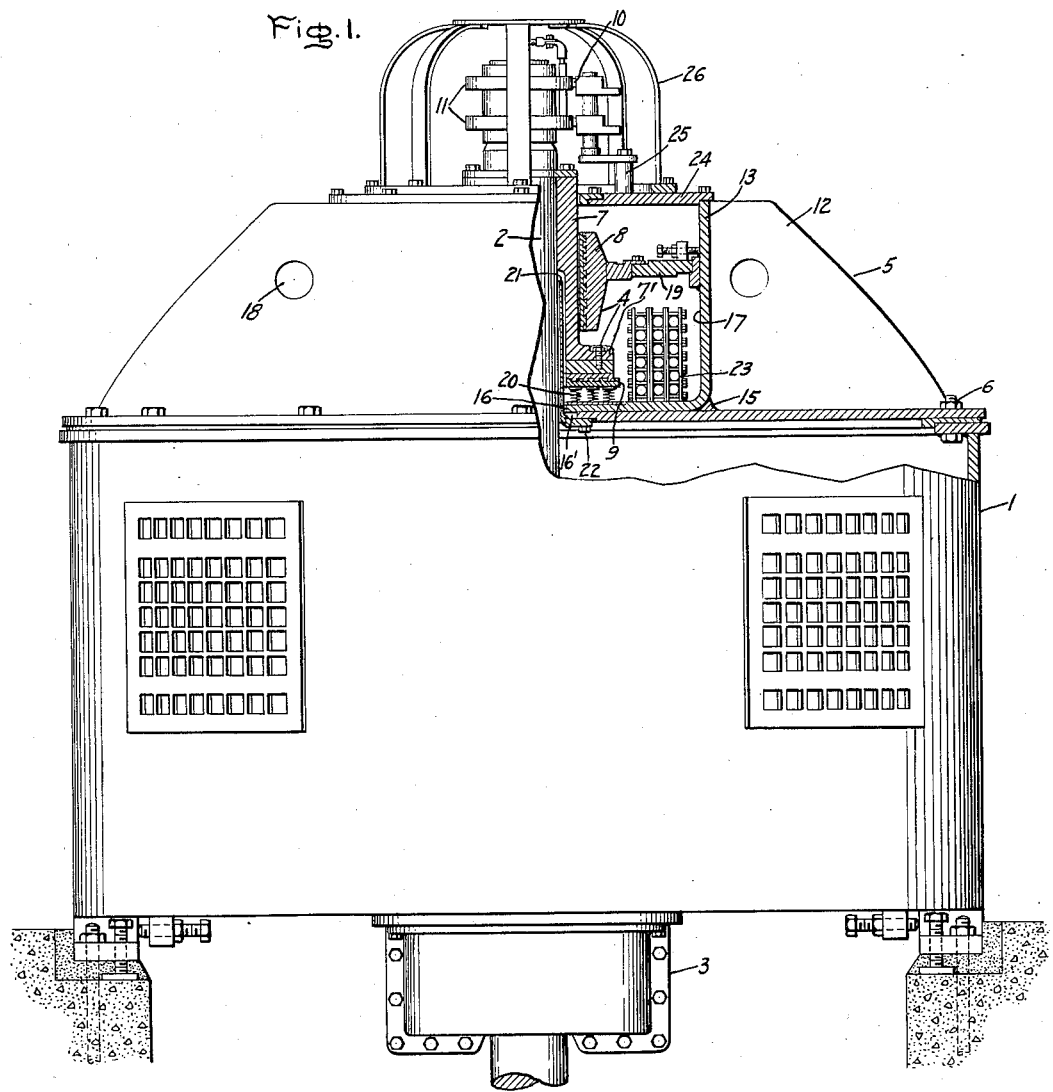
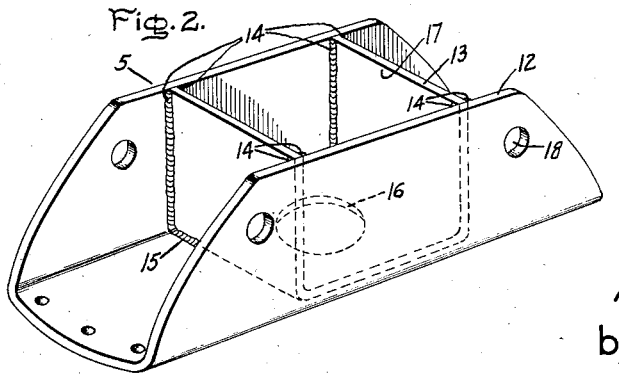
Inventor:
Alexander P. Wood,
by Chas. E. Tullar
His Attorney.

Patented Aug. 27, 1935

2,012,844

UNITED STATES PATENT OFFICE 2,012,844

BEARING BRACKET

Alexander P. Wood, Schenectady, N. Y., assignor to General Electric Company, a corporation of New York Application April 1, 1932, Serial No. 602,489

3 Claims. (Cl. 308—22)

My invention relates to bearing brackets for rotating apparatus of the vertical type.

In vertical type shaft machines, such as dynamo-electric machines, the rotatable member thereof is generally supported by a thrust bearing carried by a bearing bracket, which is in turn supported by a stationary member of the machine.

The object of my invention is to provide an improved and simplified bearing bracket for rotating apparatus of the vertical type, which is of fabricated construction, and which also forms a bearing housing.

My invention will be more fully set forth in the following description referring to the accompanying drawing, and the features of novelty which characterize my invention will be pointed out with particularity in the claims annexed to and forming a part of this specification.

In the drawing Fig. 1 is a front view, partly in section, of a dynamo-electric machine of the vertical shaft type having a bearing bracket embodying my invention, and Fig. 2 is a perspective view of the bearing bracket shown in Fig. 1.

In the drawing, I have shown my invention in connection with a dynamo-electric machine of the vertical type having a stationary member 1, and a rotatable member arranged therein and mounted on a vertical shaft 2. This vertical shaft is supported in a lower guide bearing 3 and a combined guide and thrust bearing 4, which is supported by a bearing bracket 5 secured to the stationary member 1 by bolts 6. The combined thrust and guide bearing comprises a collar 7 secured to the shaft 2 and arranged in a sleeve bearing 8 carried by the bearing bracket, and a stationary annular spring supported thrust plate 9 carried by the bearing bracket, which engages a flange 7' on the collar 7. An external circuit is connected to the windings on the rotatable member of the machine through brushes 10 supported in contact with slip rings 11 arranged on the portion of the shaft extending above the bearing bracket 5.

In accordance with my invention bearing bracket 5 is made of two U-shaped metal plates 12 and 13 arranged one within the other, as shown in Fig. 2. These U-shaped plates can readily be manufactured by bending flat plates into the form shown in the drawing. The U-shaped plate 12 constitutes a beam which extends across the top of the stationary member 1 to which it is bolted at 6. The U-shaped plate 13 is arranged transversely within the U-shaped plate 12 and rests on the bottom thereof. The arms of the U-shaped plate 13 extend between and conform with the arms of the U-shaped plate 12 and are welded thereto on both sides as indicated at 14 and at the bottom, as indicated at 15, to reinforce the construction. Central openings 16 and 16' are provided in the adjacent bottoms of the U-shaped plates to accommodate the shaft 2 of the dynamo-electric machine. By this arrangement the U-shaped plate 13 reinforces the U-shaped plate 12 to form a simple rigid construction, and the sides of the U-shaped plates constitute the walls of a rectangular bearing housing, as indicated at 17. Openings 18 are provided in the sides of the U-shaped plate 12 in which suitable lifting bars can be arranged for conveniently removing, or replacing, the bearing bracket 5 on the machine. The guide bearing 8 is secured to the side wall of the bearing housing 17 as indicated at 19 and the annular plate 9 of the thrust bearing is supported in the bottom of the bearing housing on springs 20.

In order to retain a body of lubricating oil in the bearing housing about the shaft 2 to adequately lubricate the thrust guide bearings, I provide a stationary sleeve 21 arranged about the shaft and bolted to the bottom of the bearing bracket as indicated at 22. The level of the oil in the bearing housing 17 is maintained, in any suitable manner, above the lower end of the guide bearing 8, and oil grooves, or any other suitable arrangement, is provided for feeding the oil from the bearing housing to the guide bearing. The lubricating oil contained in the bearing housing is cooled by a heat exchange device 23 arranged within the bearing housing through which cooling water is circulated. The bearing housing 17 is enclosed by a removable cover 24 on which is supported a brush holder stud 25 and a guard frame 26 arranged about the current collecting devices.

What I claim as new and desire to secure by Letters Patent of the United States, is:

1. A bearing bracket comprising a U-shaped plate constituting a supporting beam, and a second U-shaped plate arranged transversely within said first mentioned U-shaped plate and secured at the ends thereto to form a housing for a bearing, the bottom of said second U-shaped plate being adjacent the bottom of said first-mentioned U-shaped plate.

2. A bearing bracket comprising a U-shaped plate constituting a supporting beam, and a second U-shaped plate having a bottom and ends conforming to the walls of said first mentioned U-shaped plate and secured at the ends thereof to said first mentioned U-shaped plate to form a housing for a bearing.

3. A machine having a stationary member and a rotatable member including a vertical shaft, a thrust bearing for said shaft, and a bearing bracket for supporting said thrust bearing, said bearing bracket comprising a U-shaped plate constituting a supporting beam extending across said stationary member, and a second U-shaped plate arranged transversely within said first mentioned U-shaped plate and secured at the ends thereto to form a housing for said bearing, said second-mentioned U-shaped plate having a bottom and ends conforming to the walls of said first-mentioned U-shaped plate to form a housing for said bearing.

ALEXANDER P. WOOD.